United States Patent [19]

Luckhurst

[11] Patent Number: 4,842,110

[45] Date of Patent: Jun. 27, 1989

[54] DOCUMENT TRANSPORT AND PRINTING APPARATUS AND ASSOCIATED CLUTCH

[75] Inventor: Graham Luckhurst, Kitchener, Canada

[73] Assignee: NCR Corporation, Dayton, Ohio

[21] Appl. No.: 939,505

[22] Filed: Dec. 8, 1986

[51] Int. Cl.[4] ...................... F16D 13/02; F16D 67/02; F16H 13/06

[52] U.S. Cl. ........................................ 192/16; 74/204; 74/798; 192/20; 192/33 R; 192/72

[58] Field of Search ............... 192/27, 33 R, 72, 84 T, 192/16, 20, 7, 3.52; 74/798, 354, 437, 438, 204, 205, 215

[56] References Cited

U.S. PATENT DOCUMENTS

| | | | |
|---|---|---|---|
| 2,566,955 | 9/1951 | Oldenboom | 101/91 |
| 2,939,558 | 6/1960 | Schjolin | 192/3.52 |
| 3,168,773 | 2/1965 | Frye | 74/215 X |
| 3,542,176 | 11/1970 | Foxwell et al. | 74/333 X |
| 4,382,496 | 5/1983 | Yamamori et al. | 192/3.29 |
| 4,452,094 | 6/1984 | Schetter | 74/333 |
| 4,485,687 | 12/1984 | Burke et al. | 74/333 X |
| 4,592,203 | 6/1986 | Stubbs | 192/3.3 X |
| 4,648,288 | 3/1987 | Kato et al. | 74/798 |
| 4,690,256 | 9/1987 | Bopp et al. | 192/3.28 X |

FOREIGN PATENT DOCUMENTS

| | | |
|---|---|---|
| 497715 | 4/1979 | Australia . |
| 0192772 | 9/1986 | European Pat. Off. . |
| 2014523 | 1/1971 | Fed. Rep. of Germany . |
| 2445230 | 7/1980 | France . |
| 2450383 | 9/1980 | France . |
| 1551623 | 8/1979 | United Kingdom . |
| WO/86/040-21 | 7/1986 | World Int. Prop. O. . |

*Primary Examiner*—Rodney H. Bonck

*Attorney, Agent, or Firm*—Wilbert Hawk, Jr.; Albert L. Sessler, Jr.; Elmer Wargo

[57] ABSTRACT

A document transport and printing apparatus which utilizes an associated clutch for use in printing and endorsing documents like checks at a printing station in the apparatus. The apparatus utilizes a single input shaft as an input member for the clutch and as an input member for a soft drive roller located at the printing station. The clutch utilizes a moveable sector portion which is moved between inactive and active positions to rotate an associated planetary member to provide a reduction in the rotary movement of the output member of the clutch when the sector portion is moved to the active position.

9 Claims, 6 Drawing Sheets

DOCUMENT TRANSPORT AND PRINTING APPARATUS AND ASSOCIATED CLUTCH

BACKGROUND OF THE INVENTION

This invention relates generally to a document transport and printing apparatus, and more particularly, it relates to a printing apparatus and associated clutch which occupy a small space at a printing station located along a document track in a business machine like an endorser.

In recent years, efforts have been made to reduce the manufacturing costs of business machines and to reduce their overall size or "footprint". The present invention represents such an improvement.

SUMMARY OF THE INVENTION

In one aspect of the invention, the associated apparatus includes: a document track having first and second sides; a printing station located along said document track; feeding means for feeding documents serially in said document track in spaced relation along a feeding direction to said printing station; a rotatable member located on said first side and also having an axis of rotation which is parallel to said first side and adjacent thereto; said rotatable member having first, second and third cam sections thereon; rotating means for rotating said rotatable member on said axis of rotation when a document to be printed upon approaches said printing station; a pinch roller positioned on said second side to cooperate with said first cam section to move a said document through said printing station; said second cam section having a printing element thereon to print on said document while using said pinch roller as a platen; a printer; said third cam section being a combined inking roller and a platen for said printer; said printer being positioned on said second side to cooperate with said third cam section to print on a said document which is positioned between said rotatable member and said pinch roller while at said printing station; means for inking said printing element and said third cam section; and moving means for moving said documents downstream along said feeding direction from said printing station.

In another aspect of the invention a new clutch is provided. The clutch includes: an input shaft; mounting means for mounting said input shaft for rotation at a substantially constant velocity; an output member mounted on said shaft for independent rotation thereon; coupling means moveable between active and inactive positions for operatively coupling said input shaft to said output member when said coupling means is in said active position and to uncouple said input shaft from said output member when said coupling means is in said inactive position; and actuating means for moving said coupling means between said active and inactive positions, said coupling means including a planetary unit which is coupled to said input shaft to produce circular movement which rotates said output member when said input shaft is rotated and when said coupling means is moved to said active position, with said planetary unit being uncoupled from said input shaft when said coupling means is moved to said inactive position.

A feature of this invention is that it incorporates a clutch design which achieves rotary reduction so as to make use of a low-cost, high-speed shaded two pole motor in a low-speed document drive apparatus.

Other advantages and features of this invention will be more readily understood in connection with the following description, claims and drawing.

DETAILED DESCRIPTION OF THE INVENTION

Figure 1:
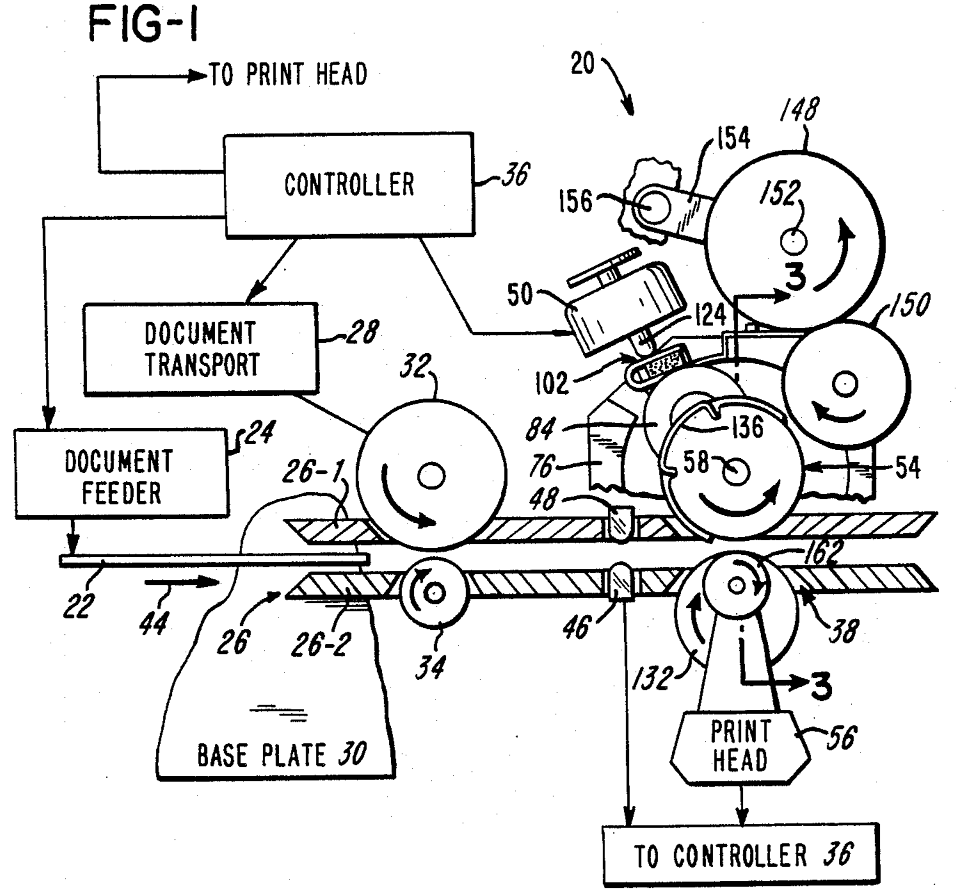
FIG. 1 is a plan view, in diagrammatic form, of a preferred embodiment of the apparatus made according to this invention showing a business machine like an endorser which includes a printing station.

FIG. 1 is a plan view, in diagrammatic form, of a preferred embodiment of the apparatus of this invention which is designated generally as 20. The apparatus 20 selected to portray this invention is a business machine like an endorser. In general, an endorser is a machine which is used by financial institutions to print certain data on the backs of documents, like checks.

Documents, like 22, to be processed by the apparatus 20, are conventionally fed from a stack by a feeding means which includes the document feeder 24 as shown in FIG. 1. The document feeder 24 feeds the documents 22 serially, in spaced relation, in the document track 26, and this feeding is continued by the document transport 28 which moves the documents, like 22, along the document track 26. The document track 26 is comprised of first and second sides 26-1 and 26-2, respectively, which are upstanding from and perpendicular to the base plate 30 which acts as a frame for the apparatus 20. The document transport 28 is conventional and is shown only as a drive roller 32 and an associated pinch roller 34 which form a high-speed, non-positive drive. The drive roller 32 is rotated in a counter-clockwise direction, as viewed in FIG. 1, to feed the documents 22 towards the right as viewed therein. The document feeder 24 and the document transport 28 are conventionally controlled by the controller 36 to move the documents 22 along the document track on their long, lower edges, with the top, long edge of document 22 being shown in FIG. 1.

Figure 2:
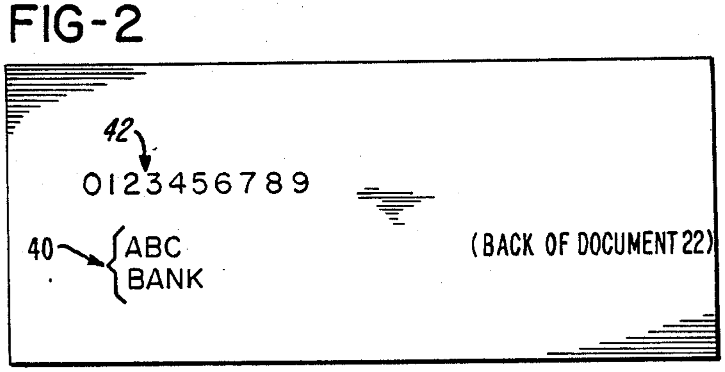
FIG. 2 is a diagram of the back of a document being processed by apparatus shown in FIG. 1.

The apparatus 20 also includes a printing station designated generally as 38. The printing which is effected at the printing station 38 includes a bank endorsement made on the back of a document 22 as shown in bracket 40 in FIG. 2 and also includes a line 42 of printing which may be tailored to the specific document 22 being processed. In the embodiment described, the side of the document 22 which is adjacent to the first side 26-1 of the document track 26 is the rear of the document 22, and the side of the document which faces the second side 26-2 of the document track 26 is the front of the document 22.

As a document 22 approaches the printing station 38 (FIG. 1) from the feeding direction shown by arrow 44, the leading edge of the document 22 is detected by a sensor 46 which cooperates with a light source 48 to produce an output signal to the controller 36. This output signal is used by the controller 36 to initiate the start of printing at the printing station 38 by energizing a solenoid 50. However, before discussing the printing operations, it appears appropriate to discuss a clutch 52 (FIG. 3) which is actuated by the solenoid 50.

The clutch 52 (FIG. 3) performs several functions associated with the printing station 38. When the clutch 52 is inactive, a document 22 is freely fed along the document track 26 past the printing station 38 without any printing being effected on the document 22. When the clutch 52 is actuated by the solenoid 50, three different major functions are performed. These functions are effected by a rotatable, output member of the clutch 52, which output member is designated generally as 54.

The first function performed by the output member 54 of the clutch 52 is to feed a document 22 at an appropriate endorsing or printing speed at the printing station 38. In this regard, the printing speed at the printing station 38 is slower than the speed at which a document is moved by the document transport 28.

A second function performed by the output member 54 of the clutch 52 (FIG. 3) is to effect the endorsement of the document 22 by printing the endorsement logo (as shown in bracket 40 in FIG. 2) on the back of the document.

And finally, the third major function performed by the output member 54 (FIG. 3) is that of cooperating with the print head 56 to print the line 42 (FIG. 2) of printing on the back of the document 22.

Figure 3:
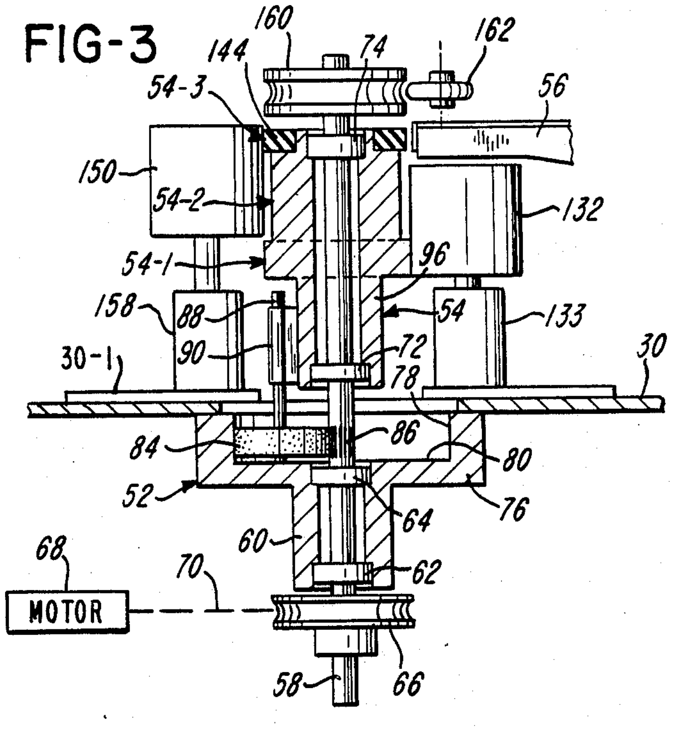
FIG. 3 is a modified, cross-sectional view, taken along the general line 3—3 of FIG. 1, to show additional details of the apparatus included at the printing station shown in FIG. 1.

Returning to the description of the clutch 52 itself, it is useful to look at FIGS. 1 and 3 of the drawing. The clutch 52 includes an input shaft 58 which is rotatably supported in a mounting means or housing 60 by suitable bearings 62 and 64. The input shaft 58 is rotated at a substantially constant velocity by a driving pulley 66 which is operatively coupled to a motor 68 by suitable, coupling linkage shown only as dashed line 70. One feature of this invention is that a low cost motor 68 is used to drive the clutch 52. In this regard, the motor 68 is a high RPM, shaded-pole motor whose output is converted to a controlled reduction in rotation of the output member 54 by the clutch 52.

The clutch 52 also includes the rotatable output member 54 already alluded to earlier herein. The output member 54 is rotatably mounted on the input shaft 58 for independent rotation thereon by bearings 72 and 74; suitable "C"-shaped washers (not shown) positioned next to the bearings 72 and 74 prevent axial movement of the output member 54 on the input shaft 58.

Figure 4:
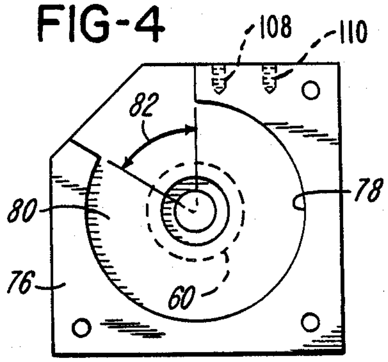
FIG. 4 is a plan view of a housing associated with a clutch used at the printing station.
Figure 5:
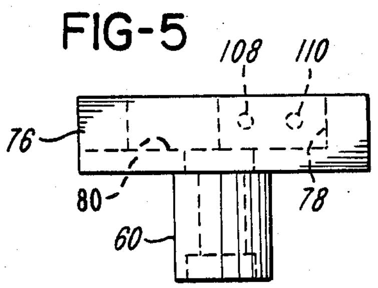
FIG. 5 a side view, in elevation, of the housing shown in FIG. 4.

The clutch 52 utilizes a special coupling means for operatively coupling the input shaft 58 to the rotatable, output member 54 to rotate it. The coupling means includes a cooperating member or housing 76 which has an inner cylindrical wall 78 as shown in FIGS. 3 and 4. The housing 76 has a floor 80 and also has a portion removed therefrom as shown in FIG. 4, and the portion removed is generally a sector of approximately sixty degrees as shown by the double arrow 82. In effect, the inner cylindrical wall 78 is not continuous but is open in the sector bounded by double arrow 82.

Figure 7:
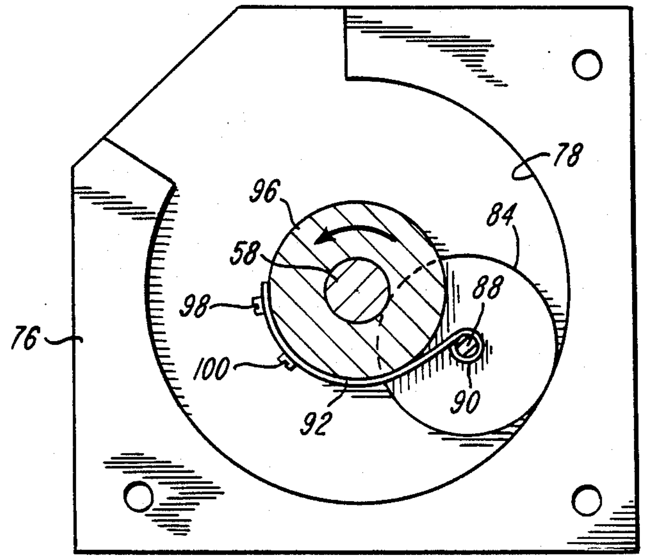
FIG. 7 is schematic view, similar to FIG. 6, to show the principle of operation of the clutch shown in FIG. 3.
Figure 8:
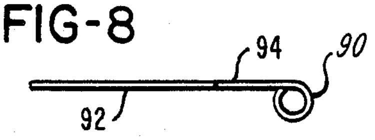
FIG. 8 is a top plan view of a leaf spring used in the clutch shown in FIG. 3.
Figure 9:
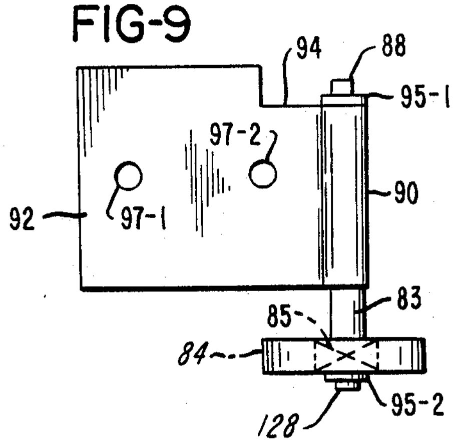
FIG. 9 is a side view of the leaf spring shown in FIG. 8.

The clutch 52 also utilizes a planetary gear principle in order to effect rotation of the output member 54. In this regard, a planetary member 84 is dimensioned to rotate between the inner cylindrical wall 78 (FIG. 3) and a serrated or gear driving portion 86 of the input shaft 58. The planetary member 84 rotates on a vertically-aligned shaft 88 extending therefrom as shown best in FIG. 3. The upper end of the shaft 88 is supported in a cylindrically-formed end 90 of a metal leaf spring 92 as shown in FIGS. 8 and 9. The leaf spring 92 has a notched out portion 94 (FIG. 9) to provide clearance for the "C"-clip 95-1 on the end of shaft 88. The leaf spring 92 has mounting holes 97-1 and 97-2 therein to enable the leaf spring 92 with the planetary member 84 thereon to be detachably mounted on the lower portion 96 (FIG. 3) of the rotatable output member 54 by fasteners 98 and 100 (FIG. 7). The planetary wheel 84 has a bearing 85 (FIG. 9) in the center thereof to enable the wheel 84 to be rotatably mounted on the shaft 88. The outer portion of the wheel 84 is made of a medium hardness urethane, and the wheel 84 is retained on the metal leaf spring 92 by bushing 83 and a "C"-clip 95-2. As the input shaft 58 is rotated in a counterclockwise direction as viewed in FIG. 7, the planetary member 84 coacts with serrated portion 86 of the input shaft 58 and the inner cylindrical wall 78 of the housing 76 to cause the planetary member 84 to move in a counterclockwise direction as viewed in FIG. 7. When the planetary member 84 moves in this direction, the rotatable output member 54 is also rotated in a counterclockwise direction via the leaf spring 92, as viewed in FIGS. 1 and 7, to perform the functions discussed generally herein.

Figure 6:
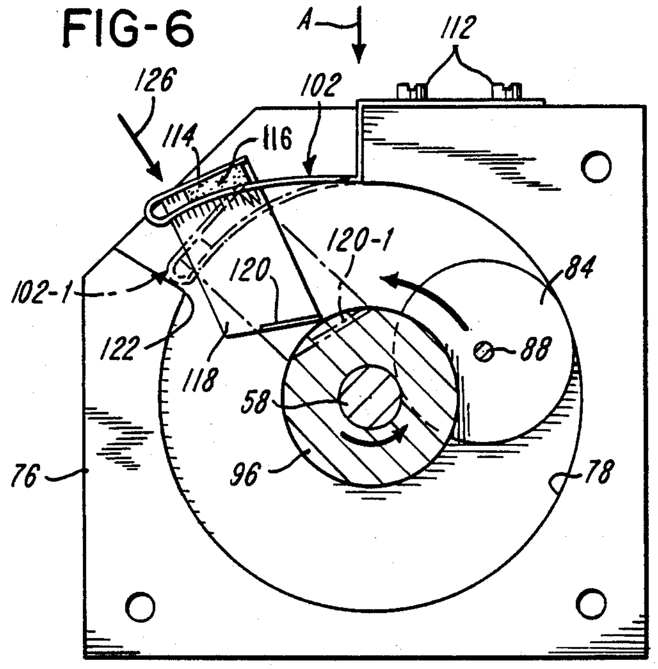
FIG. 6 is an enlarged schematic view of the housing shown in FIG. 6, with the housing being positioned to assume the same position as it does in FIG. 1.
Figure 10:
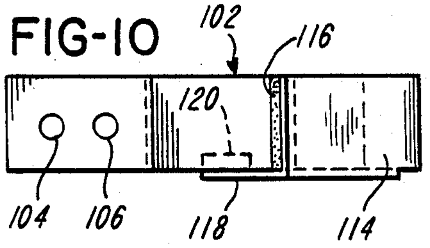
FIG. 10 is a side view, in elevation, of a moveable sector portion associated with the clutch, with the view being taken from the direction of arrow A of FIG. 6.

The coupling means for getting the clutch 52 into the active position shown in FIG. 7 also includes a movable section or sector portion 102 shown in FIG. 6. The sector portion 102 is a metal leaf spring, and it has the general shape shown in FIGS. 6 and 10. The sector portion 102 has holes 104 and 106 (FIG. 10) therein which are aligned with threaded holes 108 and 110 (FIG. 4) in the housing 76 to enable the sector portion 102 to be detachably secured thereto by fasteners 112 (FIG. 6). The sector portion 102 has a bent back portion 114 to provide some stiffness to the sector portion 102 and to provide a space in which a resilient material 116 (FIG. 6), like soft urethane may be retained. The resilient material 116 absorbs some of the shock when actuating the clutch 52. The sector portion 102 also has a plate extension 118 which has a lip 120 extending upwardly therefrom; the function of the plate extension 118 and the lip 120 will be discussed hereinafter.

The actuation of the clutch 52 occurs as follows. Assume that the clutch 52 is in the inactive state, with the solenoid 50 (FIG. 1) being in its deenergized state. In this state, the planetary member 84 is positioned so that it rests against or is near the abutment corner 122 (FIG. 6) of the housing 76. The leaf spring 92 (FIG. 7) is biased to push the planetary member 84 away from the driving or serrated portion 86 (FIG. 3) of the input shaft 58 as the planetary member 84 rotates in a counter-clockwise direction (as viewed in FIG. 6) from a prior active cycle and enters the sector portion of the housing represented by double arrow 82 in FIG. 4. The sector portion 102 is also biased to assume the solid position shown in FIG. 6 when in a free state. When the clutch 52 is to be actuated, the controller 36 energizes the solenoid 50, causing the sector portion 102 to be moved from the position shown in solid outline in FIG. 6 to the position shown in dashed outline therein and represented by sector portion 102-1. The direction of motion of the plunger 124 (FIG. 1) is substantially radial with respect to the inner cylindrical wall 78 of the housing 76, and the motion of the plunger 124 is represented by the arrow 126 in FIG. 6. As the sector portion 102 moves towards the active position (dashed outline 102-1) the planetary member 84 is moved into cooperative engagement with the serrated portion 86 on the input shaft 58. The sector portion 102 acts as a portion of the inner cylindrical wall 78 to complete the coupling to enable planetary member 84 to be rotated by the serrated portion 86 of the input shaft 58. When the planetary member 84 is rotated, it rotates the rotatable output member 54 as previously explained.

When the clutch 52 is to be deenergized, the solenoid 50 is deenergized, permitting the sector portion 102 to move from the position shown in dashed outline in FIG. 6 to the position shown in solid outline therein. This permits the planetary member 84 to become uncoupled from the input shaft 58 and causes the output member 54 to cease rotation as the planetary member 84 abuts against the abutment corner 122. In some situations, the output member 54 has such momentum that it causes the output member 54 to "ride up" the abutment corner 122 in much the same manner as a separate, freely-rotating, auto tire will "ride up" a sidewalk curb. When the output member 54 rides up the abutment corner 122, it causes an unwanted rotation of the output member 54.

To overcome unwanted cycles of operation, the shaft 88, which supports the rotatable member 84, extends slightly below the rotatable member 54 to provide a projection 128 (FIG. 9) which coacts with the lip 120 on the sector portion 102. In this regard, when the solenoid 50 is deenergized, the lip 120 (as shown in solid outline in FIG. 6) provides an interference with the projection 128 (FIG. 9) to stop the rotation of the planetary member 84. When the sector portion 102 is moved to the operative position shown in dashed outline (102-1), the lip 120, as shown in dashed outline (120-1), moves clear of the projection 128, permitting the planetary member 84 to be driven as previously described.

Earlier herein it was stated that there are several functions performed by the rotatable output member 54 when the clutch 52 is energized. To effect these functions, there are three general cam sections associated with the rotatable output member 54. The first cam section 54-1 shown above the lower portion 96 (as viewed in FIG. 3) of the rotatable output member 54 is used for feeding a document 22 through the printing station 38. The second cam section 54-2, shown above the first section 54-1, is used for stamping or endorsing bank data, for example, on the back of the document 22. And finally, the third cam section 54-3, shown above the second section 54-2, cooperates with the print head 56 to print the line 42 of data (FIG. 2) on the back of the document 22 as earlier discussed herein.

Figure 11:
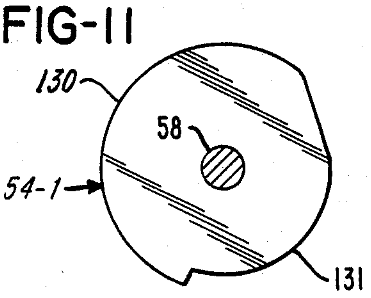
FIG. 11 is a cross-sectional profile of a first cam section of the rotatable output member of the clutch.
Figure 12:
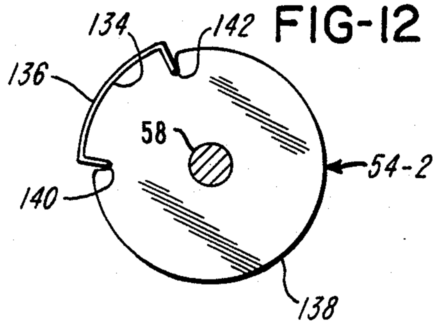
FIG. 12 is a cross-sectional profile of a second cam section of the rotatable output member of the clutch.
Figure 13:
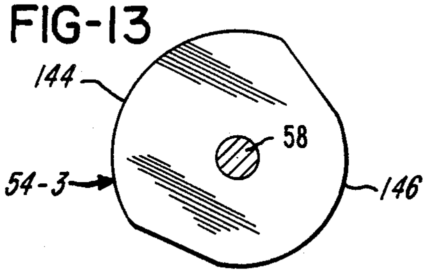
FIG. 13 is a cross-sectional profile of a third cam section of the rotatable output member of the clutch.
Figure 14:
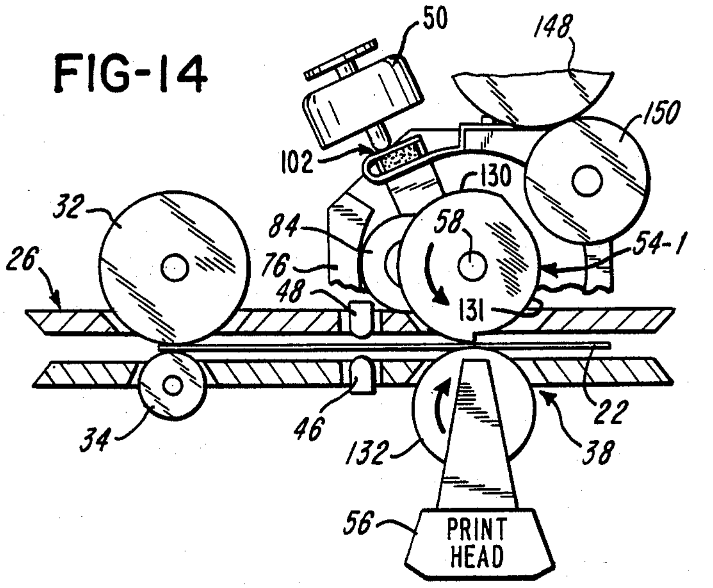
FIG. 14 is a view similar to FIG. 1, showing the first cam section of the rotatable member in operative engagement with a document.

The profiles for the first, second and third cam sections 54-1, 54-2, and 54-3, respectively, are shown in the inactive or clutch-idle state in FIGS. 11, 12, and 13. The cam sections 54-1, 54-2, and 54-3 are positioned in their operative positions in FIGS. 14, 15, and 16, respectively. Certain elements are shown in FIGS. 14, 15, and 16 to orient the reader, and certain elements are excluded from these figures in order to simplify them.

When the clutch 52 is actuated, the high, constant-radius cam surface 130 (FIG. 14) of the first cam section 54-1 of the rotatable output member 54 cooperates with its associated resilient, back-up or pinch roller 132 (FIG. 3) to move the document 22 at a controlled speed through the printing station 38. When the clutch 52 in the inactive state, the cam surface 131 of the first cam section 54-1 is positioned as shown in FIG. 11 to permit a document 22 to be fed between the cam surface 132 and the associated pinch roller 132 which is rotatably mounted in the support block 133 (FIG. 3).

Figure 15:
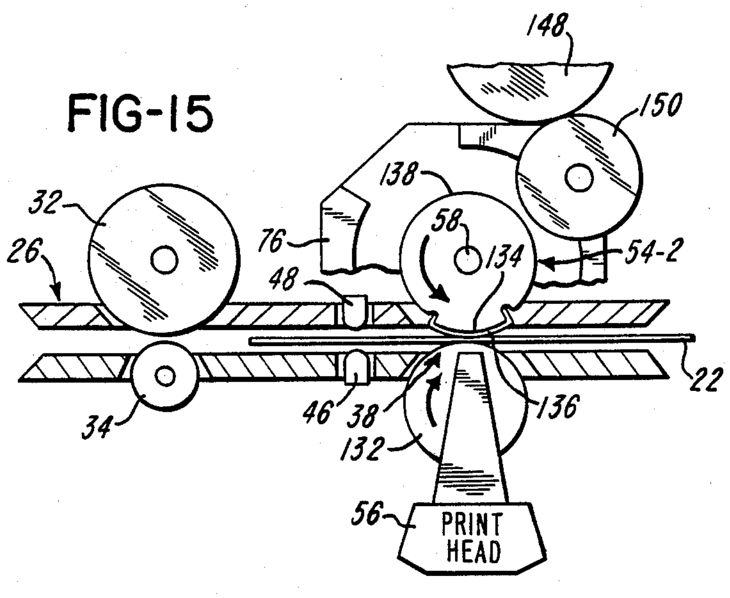
FIG. 15 is a view similar to FIG. 1, showing the second cam section of the rotatable member in operative engagement with a document.

Similarly, when the clutch 52 is actuated, the high, constant-radius, cam surface 134 of the second cam section 54-2 of the rotatable output member 54 is rotated from the position shown in FIG. 12 to the position shown in FIG. 15. In FIG. 15, the detachable logo stamp 136 cooperates with the pinch roller 132 to print the "bank logo" (shown in bracket 40 in FIG. 2) on the back of the document 22. The second cam section 54-2 has a low cam surface 138 (relative to cam surface 136) to permit a document 22 to pass through the print station 38 by widening the space between the low cam surface 138 and the pinch roller 132 when the clutch 52 is in the inactive state and the cam surface 138 is in the position shown in FIG. 12. The second cam section 54-2 has radially aligned slots 140 and 142 therein (FIG. 12) to detachably secure the logo stamp 136 therein. The logo stamp 136 has the profile shown in FIG. 12 and is generally "C" shaped in configuration to enable the ends of the logo stamp 138 to be "snapped" into the slots 140 and 142 in the second cam section 54-2.

Figure 16:
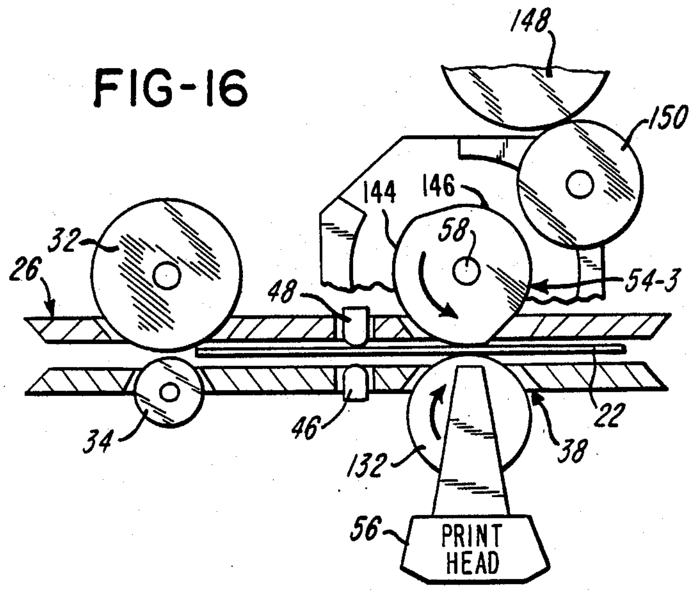
FIG. 16 is a view similar to FIG. 1, showing the third cam section of the rotatable member in operative relationship with its associated printer.

And finally, when the clutch 52 is actuated, the high, constant radius, cam surface 144 (FIG. 13) of the third cam section 54-3 of the rotatable output member 54 cooperates with the print head 56 as shown in FIG. 16, to effect the line 42 (FIG. 2) of printing on the back of the document 22 as discussed earlier herein. While the first and second cam sections 54-1 and 54-2 are made of metal, the cam section 54-3 is made of a resilient, thick, cylindrically-shaped ring of plastic material having the profile shown in FIG. 13. The cam section 54-3 is conventionally secured to the second cam section 54-2 to rotate therewith. In the embodiment described, the print head 56 is a wire matrix printer, and it is positioned relative to the high cam surface 144 so that when the associated print wires (not shown) emerge from the end of the print head, the print wires impact against the document 22 and the high cam surface 144, which is inked, to produce the line 42 of printing mentioned. The cam section 54-3 also has a low cam surface 146 thereon which permits a document 22 to pass between it and the print head 56 when the clutch 52 is in the inactive state. The line 42 of printing which is printed by the print head 56 is controlled by the controller 36 shown in FIG. 6. This feature provides flexibility in changing endorsement data for each document.

The apparatus which is used for inking the logo stamp 136 (FIG. 12), and the high cam surface 144 of the third cam section 54-3 is shown principally in FIG. 1. This apparatus includes an ink roller 148 as a source of ink and an ink transfer roller 150 which transfers the ink to the logo stamp 136 of the second cam section 54-2 (FIG. 12) and also transfers the ink to the high cam surface 144 of the third cam surface 54-3 (FIG. 13). The ink roller 148 is rotatably mounted on a rod 152 (FIG. 1) which is upstanding from one end of the lever 154 whose remaining end is pivotally joined to the base plate 30 by a pin 156. The ink roller 148 is resiliently biased into engagement with the ink transfer roller 150 by a suitable spring (not shown). The ink used is a non-drying ink which remains wet on the ink transfer roller 150, the metal logo stamp 136 and the cam section 54-3, and "drys" by being absorbed by the document 22. The ink for printing and endorsing is picked up from a prior cycle while returning to a home position. The ink transfer roller 150 is rotatably supported in a support 158 which is positioned on a baseplate 30-1 shown in FIG. 3.

A feature of the apparatus 20 is that the input shaft 58, which is used as an input to the clutch 52, is also used to rotate a drive roller 160 shown best in FIG. 3. The drive roller 160 and its associated pinch roller 162 are used to move a document 22 out of the printing station 38 when printing or endorsing is completed. The drive roller 160 is considered a "soft drive" in that it has a low coefficient of friction compared to that of pinch roller 132 which controls the rate of movement of a document through the printing station.

Some of the features of this invention are as follows:

1. The diameters of the planetary member 84 and the inner cylindrical wall 78 of the housing 76 are such as to provide a ten to one reduction in speed. This enables a low-cost, shaded, two pole motor 68 to be used.

2. The clutch 52 permits a solenoid-controlled, single-revolution, assembly for the rotatable output member 54.

3. A single shaft 58 is used as the input member for the clutch 52 and the output drive roller 160 which is a soft drive roller.

4. The sector portion 102 and the lip 120 provide a positive stop for stopping the rotatable output member 54.

5. The apparatus 20 permits documents, like 22, having a length varying from 4.5 inches to 11 inches to be processed.

6. A single input shaft 58 and the clutch 52 are housed in a single housing to provide a small "footprint".

7. The apparatus 20 uses a common ink supply roller 148 and an ink transfer roller 150 for a logo stamp and a dot matrix printer to eliminate expensive inking ribbon cartridges or cassettes.

What is claimed is:

1. A clutch comprising:

an input shaft;

mounting means for mounting said input shaft for rotation at a substantially constant velocity;

an output member mounted on said shaft for independent rotation thereon;

coupling means moveable between active and inactive positions for operatively coupling said input shaft to said output member when said coupling means is in said active position and for uncoupling said input shaft from said output member when said coupling means is in said inactive position; and actuating means for moving said coupling means between said active and inactive positions;

said coupling means including a planetary unit which is coupled to said input shaft to produce circular movement which rotates said output member when said input shaft is rotated and when said coupling means is moved to said active position, with said planetary unit being uncoupled from said input shaft when said coupling means is moved to said inactive position;

said coupling means also including a cooperating member having an inner cylindrical wall with which said planetary unit cooperates to produce said circular movement;

said cooperating member having a portion of said inner cylindrical wall removed therefrom;

said coupling means also including a section which is mounted for movement towards an active position in which said section completes said inner cylindrical wall and couples said planetary unit to said input shaft to enable said planetary unit to produce said circular movement, and also for movement towards an inactive position in which said planetary unit is uncoupled from said input shaft to stop said circular movement;

said actuating means being effective to move said section to said active position when said coupling means is moved to said active position.

2. The clutch as claimed in claim 1 in which said planetary unit comprises:

a connecting member having one end secured to said output member and a free end which is resiliently biased away from said input shaft;

a circular member; and means for rotatably mounting said circular member on said free end;

said circular member being configured to cooperate with said input shaft and with said inner cylindrical wall and said section to produce said circular movement when said coupling means is moved to said active position.

3. The clutch as claimed in claim 2 in which said mounting means and said cooperating member are made of a unitary construction.

4. The clutch as claimed in claim 2 in which said cooperating member has an abutment area near said portion of said inner wall which is removed to enable said circular member to abut against said abutment area to stop the rotation of said output member when said section of said coupling means is moved to said inactive position.

5. The clutch as claimed in claim 4 in which said input shaft has a driving portion and in which said circular member engages said driving portion and said section and said inner cylindrical wall to enable said planetary unit to produce said circular movement at a large reduction in rotary speed compared to the rotation of said input shaft.

6. The clutch as claimed in claim 5 in said driving portion is a knurled portion of said input shaft and said circular member is made of urethane.

7. The clutch as claimed in claim 6 in which said section is resiliently biased for movement towards its said inactive position;

said clutch further including a brake member secured to said section to cooperate with said planetary unit to brake said planetary unit when said section is moved towards its said inactive position.

8. The clutch as claimed in claim 7 in which said actuating means includes a solenoid to move said section from its inactive position to its active position.

9. The clutch as claimed in claim 8 in which said portion of said inner cylindrical wall which is removed comprises a sector portion of about sixty degrees.

* * * * *